July 21, 1942.   J. E. SHAFER   2,290,213
BEARING ASSEMBLY
Original Filed Feb. 5, 1940
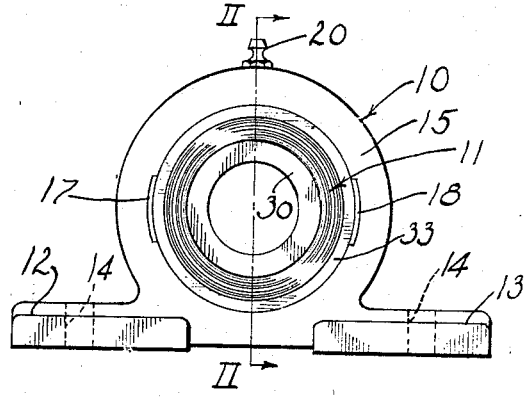
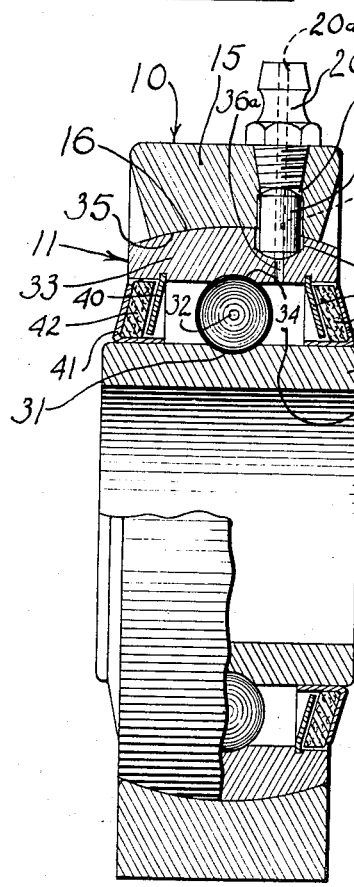
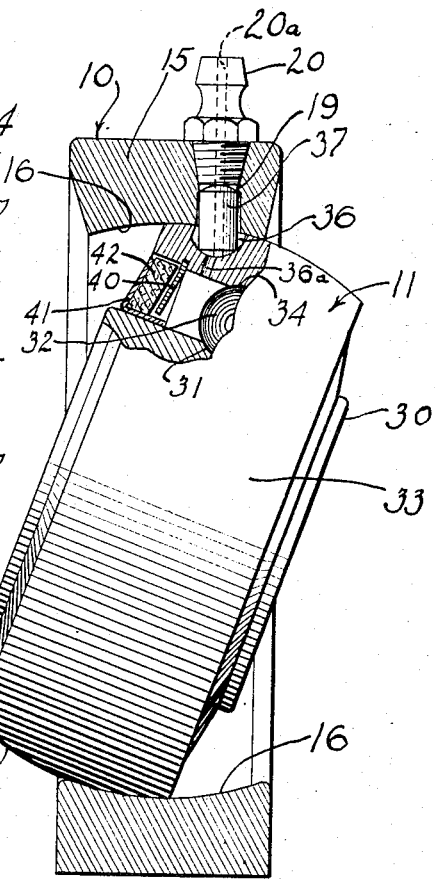
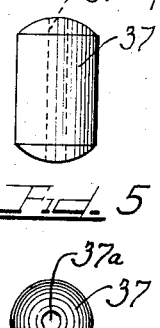
Inventor
JULIUS E. SHAFER Patented July 21, 1942

2,290,213

UNITED STATES PATENT OFFICE 2,290,213

BEARING ASSEMBLY

Julius E. Shafer, Chicago, Ill.

Original application February 5, 1940, Serial No. 317,278. Divided and this application August 11, 1941, Serial No. 406,270

2 Claims. (Cl. 308—194)

This invention relates to bearing units and housing assemblies adapted to be readily locked together in operative relation with lubricant conveying means so that the interior of the sealed units can be readily lubricated. More specifically this invention relates to the locking of a sealed bearing unit in a one-piece pillow block or other housing with a lubricant conveying locking pin which is insertable in a bore of the housing for seating in a dimple formed in the outer wall of the bearing unit.

This application is a division of my pending application entitled "Bearings," Serial No. 317,278, filed February 5, 1940.

According to this invention a housing for a bearing unit such as a pillow block has a bore extending therethrough into communication with a closed perimeter dimple or depression formed in the outer wall of the bearing unit which communicates with the interior of the bearing unit through a small bore extending from the bottom of the dimple. A locking pin, preferably having a passage therethrough is seated in the bore of the housing and projects freely therefrom into the dimple. The locking pin is larger than the bore extending from the bottom of the dimple to the interior of the bearing unit but is preferably smaller than the dimple so that the bearing unit can move relative to the housing.

A lubricant fitting is preferably threaded into the bore of the housing above or outwardly from the locking pin for supplying lubricant through the pin to the dimple. The lubricant in the dimple in turn is supplied to the interior of the bearing unit through the bore extending from the bottom of the dimple.

It is then an object of this invention to provide an improved lubricant conveying locking means between bearing units and housings for such units.

A further object of this invention is to provide a bearing unit and housing assembly having a separate locking pin projecting from the housing into a depression in the bearing unit which is capable of conveying lubricant from a fitting mounted on the housing to the interior of the bearing unit.

A further object of this invention is to provide a bearing unit and housing assembly with a lubricant conveying locking pin arrangement which will not shear off or damage the assembly.

Other and further objects of the invention will be apparent to those skilled in the art from the following detailed description of the annexed sheet of drawings which, by way of example, illustrates a preferred embodiment of the invention.

On the drawing:

Figure 1 is a side elevational view of a sealed bearing unit mounted in a one-piece pillow block in accordance with this invention.

Figure 2 is an enlarged vertical cross-sectional view, with parts in elevation, taken along the line II—II of Figure 1.

Figure 3 is a view similar to Figure 2 illustrating the bearing unit in a cocked position to show that in even such position lubricant can be readily supplied to the interior of the bearing.

Figure 4 is an enlarged side elevational view of the locking pin shown in Figures 2 and 3.

Figure 5 is a top plan view of the locking pin shown in Figure 4.

As shown on the drawing:

In Figures 1, 2 and 3, the reference numeral 10 designates generally a one-piece pillow block having a sealed bearing unit 11 mounted therein. As shown in Figure 1, the pillow block 10 is provided with feet 12 and 13 having holes or slots 14 formed therethrough for receiving bolts to rigidly attach the pillow block to a supporting structure (not shown). An annular strap portion 15 is formed intermediate the feet 12 and 13 and is provided with a concave or depressed inner face 16 forming a bearing surface for the outer race ring of the sealed bearing unit 11.

Slots or grooves 17 and 18 are formed in the strap portion 15 on the inner wall thereof to permit insertion of the bearing unit horizontally into the pillow block. The bearing, when thus inserted in the slots 17 and 18, can then be rotated to a vertical position to be seated on the bearing wall 16 of the strap 15.

The top of the strap 15 has a radial bore 19 therethrough receiving a lubricant fitting 20 in threaded relation therein. The lubricant fitting projects from the top of the pillow block and has a passageway 20a therethrough for supplying lubricant to the interior of the bore for a purpose to be hereinafter more fully described.

The bearing unit 11, as best shown in Figures 2 and 3, comprises an inner race ring 30 adapted to be disposed around the shaft or other rotating member (not shown). The race ring 30 has a circumferential groove 31 forming a raceway for a row of ball bearings such as 32. An outer race ring 33 is disposed in spaced concentric relation around the race ring 30 and has a groove 34 around the inner circumference thereof for receiving the row of ball bearings such as 32. The ball bearings thus hold the race rings 30 and 32 in spaced concentric relation.

The periphery of the outer race ring 33 has a convex surface 35 for fitting in the concave surface of the strap 15 as shown in Figures 2 and 3. A well or closed perimeter dimple or depression 36 is formed in the outer race ring 33 for receiving a retainer pin 37 projecting freely from the bore 19 in the strap 15. The retainer pin 37 fits loosely in the dimple 36 and has an axial passage 37a therethrough for transmitting lubricant from the passageway 20a of the fitting 20 to the dimple 36. The bottom of the dimple has a passageway 36a extending therefrom into the space between the race rings 30 and 33. The passageway 36a preferably communicates with the space between the race ring in spaced relation from the raceways 31 and 34 thereof so that the ball bearings 32 will not wear or chip the mouth of the passageway as they rotate under loads.

In this manner lubricant is supplied to the antifriction elements between the race rings and the outer race ring is held in the pillow block. However, the bearing unit 11 can have limited universal movement relative to the pillow block since the retaining pin 37 fits loosely in the dimple 36. The space between the race rings, nevertheless, is always held in communication with a source of lubricant since the passageways 20a, 37a and 36a are always in communication with this space even though the bearing unit assumes an extreme cocked position, as shown in Figure 3, by rotation of the unit for 180° in the pillow block.

As shown in Figures 2 and 3, the space between the race ring is sealed by means of seals comprising retainer rings 40 pressed into the outer race ring 33, flingers 41 pressed onto the inner race ring and felt washers 42 carried by the flingers in the spaces between the flingers and retainers. As a result, a sealed ball bearing chamber 43 is provided which, as explained above, is always in full communication with a source of lubricant.

I claim as my invention:

1. In a bearing assembly including a housing having a one-piece interior annular wall and a bearing unit having an exterior annular wall for seating on said interior annular wall of the housing, said housing having a bore therethrough adapted to receive a lubricant fitting, and said exterior annular wall of the bearing unit having a closed perimeter dimple therein with a small bore extending from the dimple to the interior of the bearing unit, the improvement which comprises a locking pin projecting freely from the bore of the housing into said dimple and said pin being so formed with respect to said bore of the housing to permit free flow of lubricant from the fitting to the dimple while loosely retaining the bearing unit in the housing.

2. In a bearing assembly including a housing having a one-piece interior annular wall with a bore therethrough and a sealed bearing unit having an exterior annular wall for seating on said interior annular wall of the housing, the improvements which comprise said exterior wall of the bearing unit having a closed perimeter dimple therein adapted to register with said bore of the housing, said dimple having a small bore extending from the bottom thereof to the interior of the bearing unit, and a hollow retaining pin in said bore of the housing extending freely therefrom into the dimple, said retaining pin being disposed freely in the dimple but being larger than the bore extending from the dimple to the interior of the housing whereby said pin will lock the housing and bearing unit together while maintaining the bearing unit in constant communication with the bore of the housing to receive lubricant therefrom.

JULIUS E. SHAFER.